(12) United States Patent
Wang et al.

(10) Patent No.: US 8,284,242 B2
(45) Date of Patent: Oct. 9, 2012

(54) INTEGRATED ELECTROCHROMIC 2D/3D DISPLAY DEVICE

(75) Inventors: Yin Wang, Taichung County (TW); Chun-Fu Liu, Taoyuan County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 564 days.

(21) Appl. No.: 12/542,701

(22) Filed: Aug. 18, 2009

(65) Prior Publication Data

US 2010/0253767 A1 Oct. 7, 2010

(30) Foreign Application Priority Data

Apr. 7, 2009 (TW) .............................. 98205538 U

(51) Int. Cl.
*H04N 15/00* (2006.01)
*H04N 13/04* (2006.01)

(52) U.S. Cl. .......................................... 348/51; 348/46
(58) Field of Classification Search .................... 348/46, 348/51
See application file for complete search history.

(56) References Cited

U.S. PATENT DOCUMENTS

| 7,215,475 | B2 * | 5/2007 | Woodgate et al. ............ 359/624 |
| 7,426,068 | B2 * | 9/2008 | Woodgate et al. ............ 359/237 |
| 8,113,901 | B1 * | 2/2012 | Yeh et al. ........................ 445/24 |
| 8,115,985 | B2 * | 2/2012 | Liu ................................ 359/273 |

* cited by examiner

*Primary Examiner* — Michael Won
(74) *Attorney, Agent, or Firm* — Jianq Chyun IP Office

(57) ABSTRACT

An integrated electrochromic 2D/3D display device including a first substrate; a parallax barrier unit disposed under the first substrate; a color filter unit disposed under the parallax barrier unit; a common electrode disposed under the color filter unit; a liquid crystal unit disposed under the common electrode; a plurality of thin film transistors disposed under the liquid crystal unit; a second substrate disposed under the plurality of thin film transistors; and a light emitting unit disposed under the second substrate is provided. Another integrated electrochromic 2D/3D display device including a substrate; a parallax barrier unit disposed under the substrate; and a display unit disposed under the parallax barrier unit is also provided. An adjustment of a planar image and a stereo image is performed to reduce a thickness and an assembling cost of conventional display devices.

8 Claims, 2 Drawing Sheets

INTEGRATED ELECTROCHROMIC 2D/3D DISPLAY DEVICE

CROSS-REFERENCE TO RELATED APPLICATION

This application claims the priority benefit of Taiwan application serial No. 98205538, filed on Apr. 7, 2009. The entirety of the above-mentioned patent application is hereby incorporated by reference herein and made a part of this specification.

BACKGROUND OF THE INVENTION

1. Field of Invention

The present invention relates to an integrated electrochromic display device, and more particularly to an integrated electrochromic 2D/3D display device applied in a field of displaying planar and stereo images and reducing a thickness and an assembling cost of conventional display devices.

2. Description of Related Art

Currently, display devices capable of generating stereo images are categorized into spatial-multiplexed mechanism and time-multiplexed mechanism. In spatial-multiplexed mechanism, an image is divided into left and right eye display regions. A parallax barrier or a lenticular screen array is utilized to project the image to a viewer's left and right eyes respectively. The left and right eyes receive the image respectively to generate parallax for generating a stereo image in the brain. In time-multiplexed mechanism, a spectroscopic mechanism is applied to continuously transmit the respective images to be received by left and right eyes to the viewer's left and right eyes so as to generate stereo images.

For a display device with the spatial-multiplexed mechanism, stereo images are mainly resulted from binocular parallax. In the theory of binocular parallax, since the eyes of a person are at different positions and have different viewing angles, image contents received are also different. Finally, the image contents are integrated to generate the stereo image. Moreover, stereo images are also generated by motion parallax caused by an alteration in the image contents due to a change (usually caused by the shifting of the head) in the viewing angle of the human eye. A perfect stereo vision obtains both of the above and avoids a factor of stationary or dynamic to affect the display effect. However, as limitations in the current technology, a moving range in observation, and the display device are usually the fixed factors, the current stereo display technique still adopts the theory of binocular parallax as a main stream.

Referring to FIG. 1, currently, a liquid crystal display (LCD) device generating stereo images with the current spatial-multiplexed mechanism includes a liquid crystal (LC) panel 10 and a parallax barrier 50 for generating a stereo image effect. The LCD device further includes a backlight module, which is a component well-known in the art, to provide a light source. Since the present invention is not directly related thereto, no further illustration is not provided herein.

The LC panel 10 is configured to generate images and includes an assembled substrate 101 and a color filter on array (COA) integrated substrate 102. An LC unit 103 is disposed between the assembled substrate 101 and the COA integrated substrate 102 and includes LC molecules.

The assembled substrate 101 includes a transparent substrate 1011 and a conductive film 1012, which is transparent, conductive, and plated on a surface of the transparent substrate 1011. Additionally, the substrate 1011 is a transparent glass thin plate.

The integrated substrate 102 includes a transparent substrate 1021, a plurality of thin film transistors (TFTs) 1022, a pixel unit 1023, and a conductive film 1024. The transparent substrate 1021 is a transparent thin plate.

The TFTs 1022 are disposed on one side of the transparent material 1021 in an array to controllably change a state of the LC molecules in the LC unit 103.

The pixel unit 1023 is formed on the side of the transparent substrate 1021 in a thin layer type and covers on the TFTs 1022. The pixel unit 1023 has a non-transparent black pixel 1025 and a plurality of red pixels 1026, blue pixels 1027, and green pixels 1028 that are formed after the light passed.

The conductive film 1024 is transparent, conductive, and formed on the pixel unit 1023. Moreover, the conductive film 1024 controls through the TFTs 1022 to cooperate with the conductive film 1012 of the assembled substrate 101 for generating a voltage difference to adjust the state of the LC molecules, thereby controlling whether the light passes through the LC unit 103 or not.

The parallax barrier 50 is also manufactured with a transparent glass substrate to correspondingly change a path of a light passing through the LC panel 10. Consequently, the lights passing through the parallax barrier 50 are projected to a viewer 11's left and right eyes respectively. A parallax is generated after the left and right eyes of the viewer 11 have received the light correspondingly so that the viewer 11 perceives a stereo image. Since a detailed structure of the parallax barrier 50 has already been disclosed in relevant technical documents (i.e. Taiwan Patent Application No. 092134361 and British Patent No. GB2399653), the structure thereof is not repeated herein.

In an operation of the LCD device generating the stereo images with the spatial-multiplexed mechanism, a back light module provides a uniform planar single polarized light. When passing through the LC panel 10, the black pixels 1025, the red pixels 1026, the blue pixels 1027, and the green pixels 1028 on the COA integrated substrate 102 turn the planar single polarized light into a light with a predetermined color. Simultaneously, the TFTs 1022 are applied to control the state of predetermined LC molecules in the LC unit 103 so as to control this colored light to pass through the LC unit 103 for forming a colored image. Next, the colored lights that are generated simultaneously are changed correspondingly when passing through the parallax barrier 50, thereby projecting into the left and right eyes of the viewer 11. The left and right eyes of the viewer receive correspondingly and generate parallax to consequently generate the stereo image in the viewer 11's brain.

However, the two transparent substrates 1011, 1021 of the LC panel 10 and the transparent substrate of the parallax barrier 50 constitute three transparent glass substrates and increase a thickness of the LCD device generating the stereo images with the spatial-multiplexed mechanism.

Since disadvantages of the LCD device generating stereo images with the conventional spatial-multiplexed mechanism are improved, an integrated electrochromic 2D/3D LCD device is provided in the invention and configured to reduce the thickness of the LCD device generating stereo images with the conventional spatial-multiplexed mechanism.

SUMMARY OF THE INVENTION

The present invention is directed to an integrated electrochromic 2D/3D liquid crystal display (LCD) device capable of reducing the use of transparent substrates to reduce an overall thickness of an LCD device generating stereo images with a conventional spatial-multiplexed mechanism.

The present invention is further directed to an integrated electrochromic 2D/3D LCD device capable of omitting an assembling process of an LCD panel and a parallax barrier to enhance an overall processing yield.

According to an embodiment of the present invention, an integrated electrochromic 2D/3D display device provided in the present invention includes: a first substrate; a parallax barrier unit disposed under the first substrate; a color filter unit disposed under the parallax barrier unit; a common electrode disposed under the color filter unit; a liquid crystal (LC) unit disposed under the common electrode; a plurality of thin film transistors (TFTs) disposed under the LC unit; a second substrate disposed under the TFTs; and a light emitting unit disposed under the second substrate, in which an adjustment of a planar image and a stereo image is performed via the parallax barrier unit.

According to an embodiment of the present invention, another integrated electrochromic 2D/3D display device provided in the present invention includes a substrate; a parallax barrier unit disposed under the substrate; and a display unit disposed under the parallax barrier unit, in which an adjustment of a planar image and a stereo image is performed via the parallax barrier unit.

In order to the make aforementioned and other objects, features and advantages of the present invention comprehensible, preferred embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
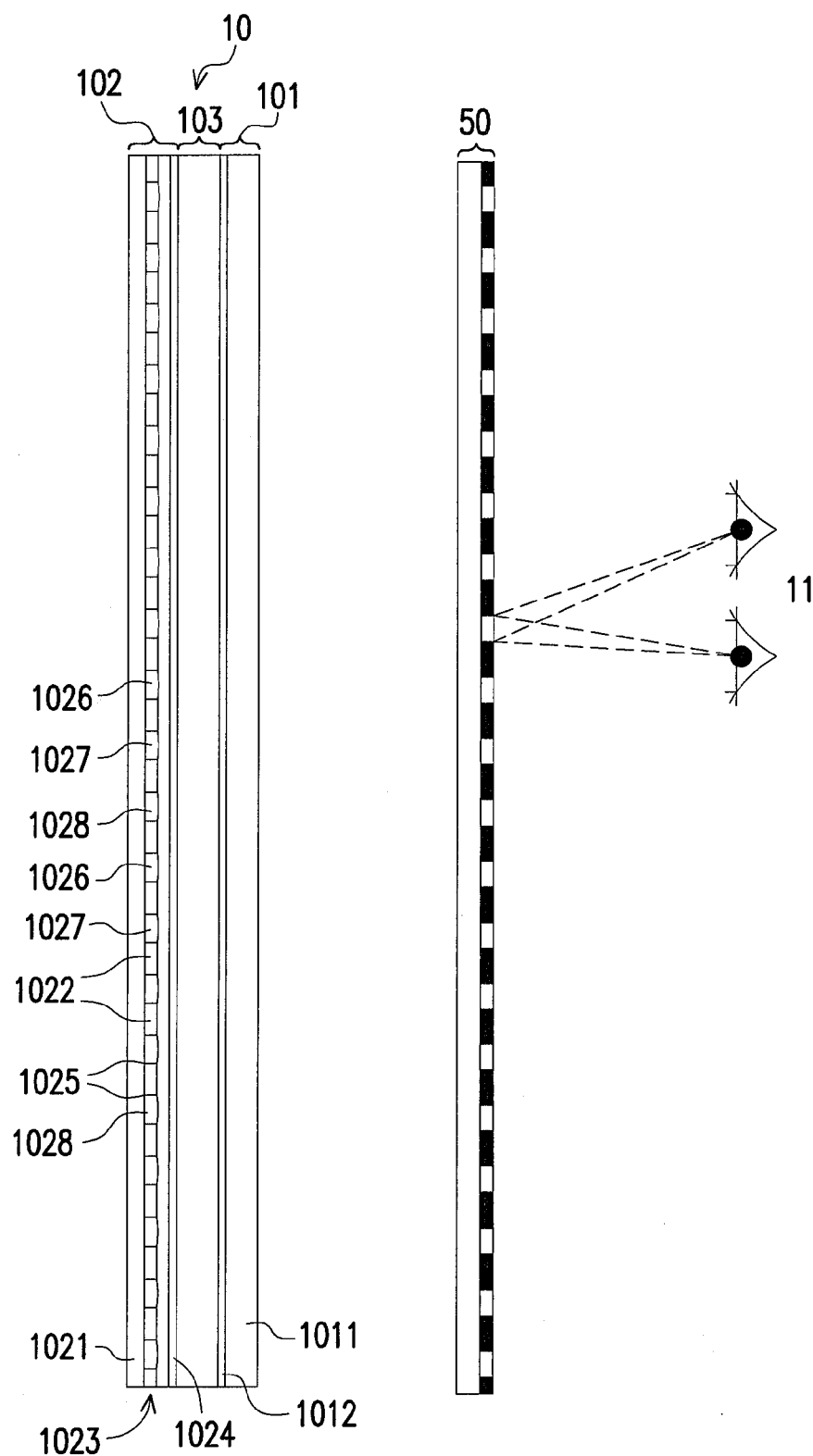
FIG. 1 is a schematic structural diagram of a liquid crystal display (LCD) device generating stereo images with a conventional spatial-multiplexed mechanism.
Figure 2:
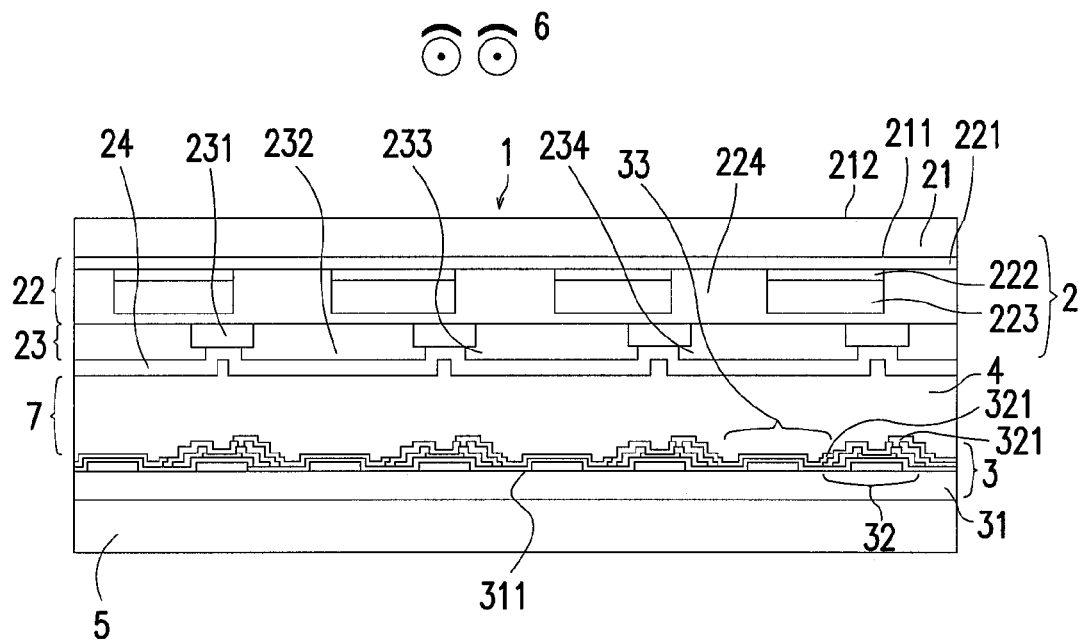
FIG. 2 is a schematic side view of an integrated 2D/3D display device according to a first embodiment of the present invention.

Referring to FIG. 2, an integrated electrochromic 2D/3D display device 1 is provided in a first embodiment of the present invention. The integrated electrochromic 2D/3D display device 1 includes a first substrate 21, a parallax barrier unit 22 disposed under the first substrate 21, a color filter unit 23 disposed under the parallax barrier unit 22, and a common electrode 24 disposed under the color filter unit 23 to form an integrated substrate 2. The integrated electrochromic 2D/3D display device 1 further includes a liquid crystal (LC) unit 4 disposed under the common electrode 24, a plurality of thin film transistors (TFTs) 32 disposed under the LC unit 4, a second substrate 31 disposed under the TFTs 32; and a light emitting unit 5 disposed under the second substrate 31. The second substrate 31, the TFTs 32, and a plurality of pixel units 33 form an active array substrate 3.

The first substrate 21 is a transparent glass thin plate and includes a first surface 211 and a second surface 212. Other polymer materials that meets the optical standard and obtains flexibility, such as acrylic resins, polycarbonate and the like, are also adopted as a material for the first substrate 21.

A transparent pixel electrode 321 on the pixel unit 33 and the common electrode 24 assemble an electrical field to control and alter an optical state of LC molecules in the LC unit 4, so that the optical state of an emitted light passing out from the LC unit 4 fulfills requirements of a frame to be displayed.

The parallax barrier unit 22 is formed on the first surface 211 of the first substrate 21 of the integrated substrate 2. Moreover, the parallax barrier unit 22 includes, from top to bottom, a transparent electrode layer 221, a patterned electrochromic layer 222, and a patterned transparent conductive layer 223. A same voltage is applied to the transparent electrode layer 221 and the patterned electrochromic layer 222 for setting the value of the electrical field to be zero, so that the color and transparency of the patterned electrochromic layer 222 remain in the same state. For example, the patterned electrochromic layer 222 is transparent, and a left eye and a right eye of a viewer 6 receive the same images to perceive a planar image. On the contrary, when different voltages are applied to the transparent electrode layer 221 and the patterned electrochromic layer 222 for generating an electrical field, the color and transparency of the patterned electrochromic layer 222 are changed. For instance, the patterned electrochromic layer 222 becomes black, then lights are emitted simultaneously, passed through the parallax barrier unit 22 and projected to the left eye and right eye of the viewer 6 respectively to generate parallax, so that the viewer 6 perceives a stereo image.

The color filter unit 23 includes at least a red filter layer 232, at least a blue filter layer 233, at least a green filter layer 234, and at least a black shielding layer 231. Moreover, the black shielding layer 231 separates the red filter layer 232, the blue filter layer 233, and the green filter layer 234.

The common electrode 24 includes a transparent and conductive material, such as indium tin oxide (ITO), formed on the color filter unit 23 and adjacent to a storage space 7. The common electrode 24 controls the transparent electrode layer 221 of the integrated substrate 2 through the TFTs 32 to generate a voltage difference for adjusting the state of the LC molecules, thereby controlling whether the light passes through the LC unit 4.

In the present embodiment, the parallax barrier unit 22 sequentially includes a transparent conductive material formed on the transparent electrode layer 221 on the first surface 211, an electrochromic material formed on the patterned electrochromic layer 222 on the transparent electrode layer 221, and a patterned transparent conductive layer 223. The patterned electrochromic layer 222 is selected from a group consisting of materials such as transition metal oxides ($WO_3$, $TiO_2$, $MoO_3$, $V_2O_5$, $Nb_2O_5$, $CoO_2$, $Co(OH)_2$, $Mn_2O_3$, $NiO_x$, $Ni(OH)_2$, and $CuO_x$), Prussian blue, organic compounds, polymer polymers, and the like. The valence number of the material is modified due to changes in the electrical field so as to result in coloration and bleaching. The transparent electrode layer 221 and the patterned transparent conductive layer 223 are controlled to change the voltage for altering the state of the valance number of the patterned electrochromic layer 222. Consequently, paths of the lights emitted simultaneously and passing through the parallax barrier unit 22 are changed and projected to the viewer 6's left and right eyes respectively to generate parallax, so that a stereo image is generated in the viewer 6's brain.

Figure 3:
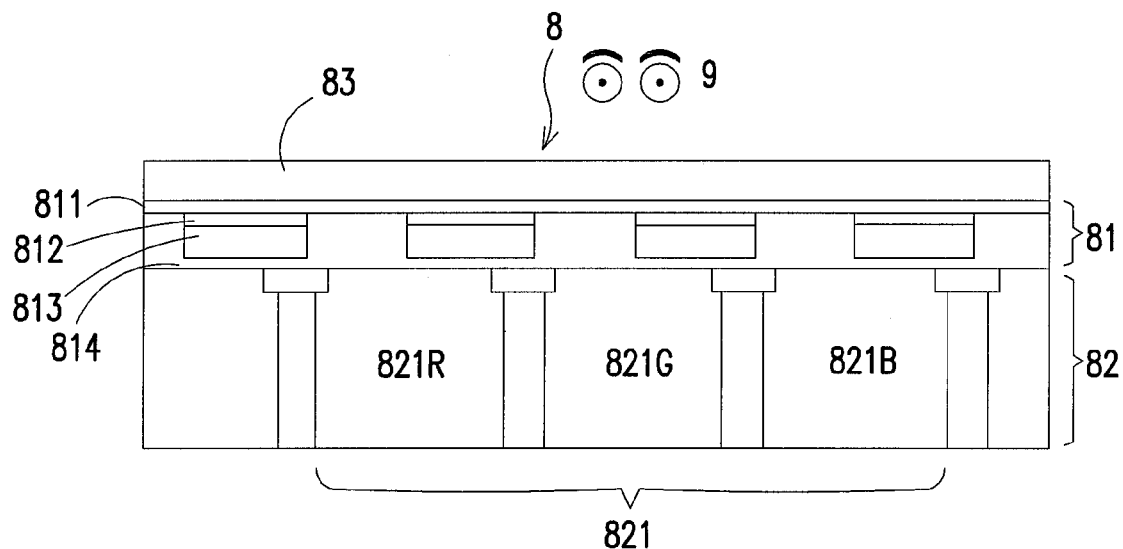
FIG. 3 is a schematic side view of an integrated 2D/3D display device according to a second embodiment of the present invention.

Referring to FIG. 3, another integrated electrochromic 2D/3D display device 8 is provided according to a second embodiment of the present invention. The integrated electrochromic 2D/3D display device 8 includes a substrate 83, a parallax barrier unit 81 disposed under the substrate 83, and a display unit 82 disposed under the parallax barrier unit 81, in which the display unit 82 includes at least a pixel 821 formed by at least a red pixel 821R, at least a blue pixel 821B, and at least a green pixel 821G. The parallax barrier unit 81 includes, from top to bottom, a transparent electrode layer 811, a patterned electrochromic layer 812, and a patterned transparent conductive layer 813. A same voltage is applied to the transparent electrode layer 811 and the patterned transparent conductive layer 813 for setting the value of the electrical field to zero, so that the color and transparency of the patterned electrochromic layer 812 remain in the original state. For example, the patterned electrochromic layer 812 is transparent, at this time, lights emitted by the display unit 82 pass through the parallax barrier unit 81 and are projected to a viewer 9's left and right eyes respectively. The left and the right eyes of the viewer 9 receive the same images to perceive a planar image. On the contrary, when different voltages are applied to the transparent electrode layer 811 and the patterned transparent conductive layer 813 to generate an electrical field, the color and transparency of the patterned electrochromic layer 812 are changed. For example, the patterned electrochromic layer 812 becomes black, then the lights emitted by the display unit 82 pass through the parallax barrier unit 81 and are projected to the left and right eyes of the viewer 9 for generating parallax, so that the viewer 9 perceives a stereo image.

Here, the display unit 82 is a display unit of a plurality of self-illuminating devices, such as a plasma display device, a cathode ray tube, a light emitting diode, and other active light emitting display units, or a projection display device and other passive light emitting display units adopting backlight modules as light sources thereof.

In summary, the present invention has the following advantages:

1. In the present invention, the structure of the LCD device generating the stereo images with the conventional spatial-multiplexed mechanism is simplified, and the thickness of the LCD device generating the stereo images with the conventional spatial-multiplexed mechanism is reduced.

2. In the present invention, the loss caused by assembling deviations in the assembling process of the parallax barrier and the LC panels are prevented, the manufacturing procedure is simplified, the assembling cost is reduced, and the time for manufacturing the 2D/3D display device is shortened.

Although the present invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. An integrated electrochromic 2D/3D display device, comprising:
    a substrate;
    a parallax barrier unit disposed under the substrate, wherein the parallax barrier unit comprises, from top to bottom, a transparent electrode, a patterned electrochromic layer, and a patterned transparent conductive layer; and
    a display unit disposed under the parallax barrier unit,
    wherein an adjustment of a planar image and a stereo image is performed via the parallax barrier unit.

2. The integrated electrochromic 2D/3D display device as claimed in claim 1, wherein the transparent electrode and the patterned transparent conductive layer are applied with a same voltage, so that a color and a transparency of the patterned electrochromic layer remain unchanged.

3. The integrated electrochromic 2D/3D display device as claimed in claim 1, wherein the transparent electrode and the patterned transparent conductive layer are applied with different voltages to generate an electrical field, so that the color and the transparency of the patterned electrochromic layer are changed.

4. The integrated electrochromic 2D/3D display device as claimed in claim 1, wherein the display unit comprises at least a red pixel, at least a blue pixel and at least a green pixel, and the display unit comprises a display unit of a plasma display device, a display unit of a cathode ray tube, a display unit of a light emitting diode, or a display unit of a projection display device.

5. An integrated electrochromic 2D/3D display device, comprising:
    a first substrate;
    a parallax barrier unit disposed under the first substrate, wherein the parallax barrier unit comprises, from top to bottom, a transparent electrode, a patterned electrochromic layer, and a patterned transparent conductive layer;
    a color filter unit disposed under the parallax barrier unit;
    a common electrode disposed under the color filter unit;
    a liquid crystal unit disposed under the common electrode;
    a plurality of thin film transistors disposed under the liquid crystal unit;
    a second substrate disposed under the plurality of thin film transistors; and
    a light emitting unit disposed under the second substrate,
    wherein an adjustment of a planar image and a stereo image is performed via the parallax barrier unit.

6. The integrated electrochromic 2D/3D display device as claimed in claim 5, wherein the color filter unit comprises at least a red filter layer, at least a blue filter layer, at least a green filter layer, and at least a black shielding layer, and the black shielding layer separates the red filter layer, the blue filter layer, and the green filter layer.

7. The integrated electrochromic 2D/3D display device as claimed in claim 5, wherein the transparent electrode and the patterned transparent conductive layer are applied with a same voltage, so that a color and a transparency of the patterned electrochromic layer remain unchanged.

8. The integrated electrochromic 2D/3D display device as claimed in claim 5, wherein the transparent electrode and the patterned transparent conductive layer are applied with different voltages to generate an electrical field, so that the color and the transparency of the patterned electrochromic layer are changed.

* * * * *